Figure 1:
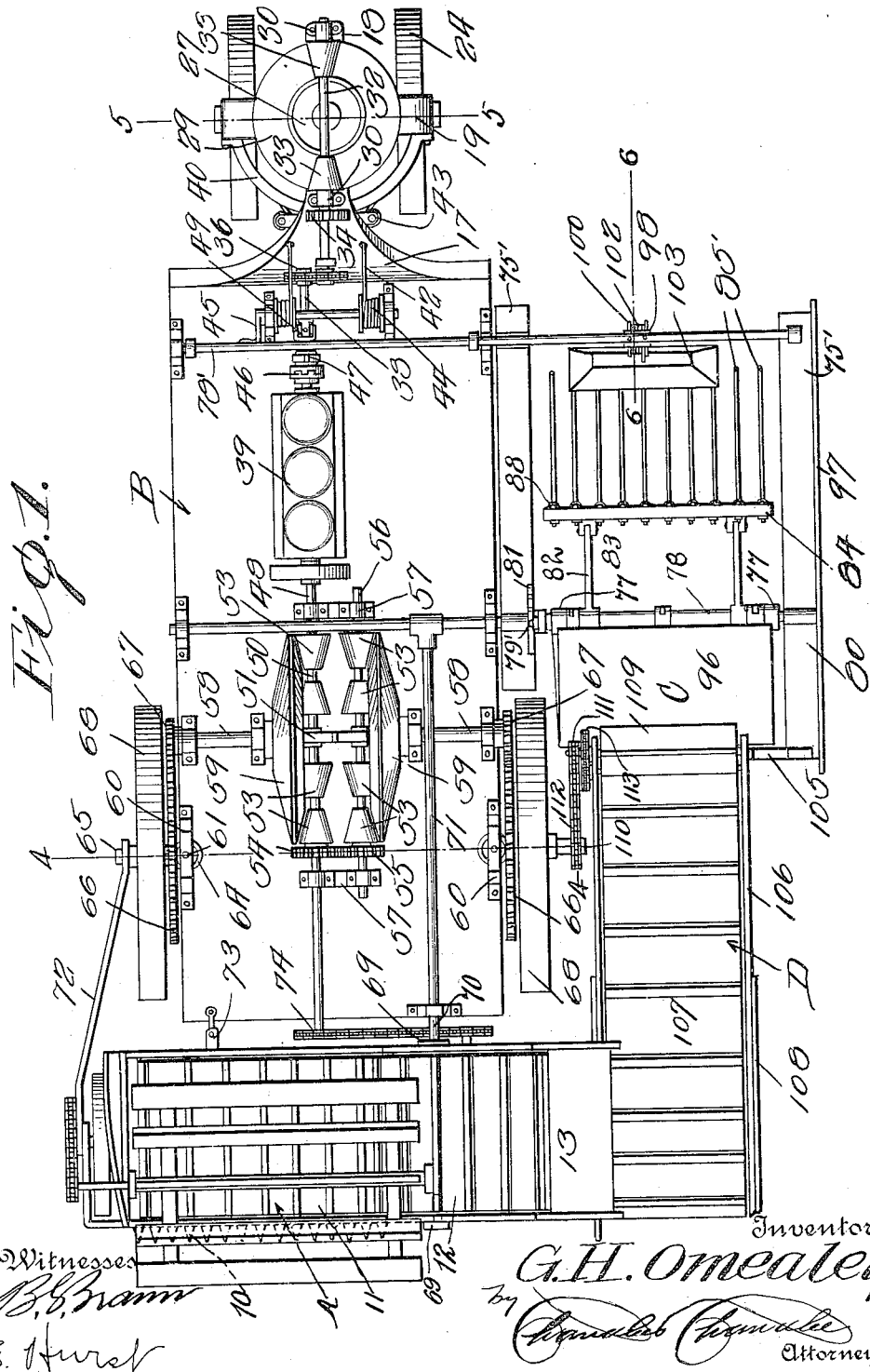

G. H. OMEALEY.
GRAIN SHOCKER.
APPLICATION FILED MAR. 24, 1913.

1,204,183.

Patented Nov. 7, 1916.
6 SHEETS—SHEET 1.

Witnesses
B. E. Brann
E. Hurst

Inventor
G. H. Omealey
by
Chandler & Chandler
Attorneys

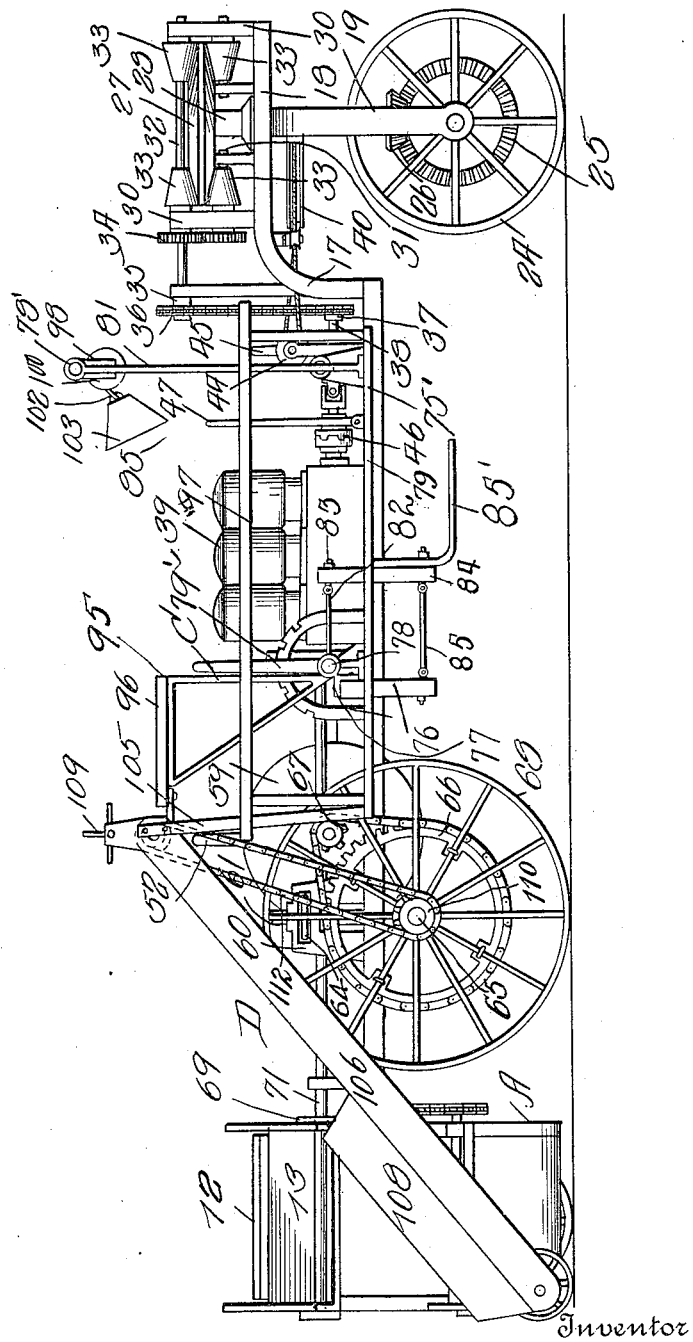

G. H. OMEALEY.
GRAIN SHOCKER.
APPLICATION FILED MAR. 24, 1913.
1,204,183.
Patented Nov. 7, 1916.
6 SHEETS—SHEET 3.
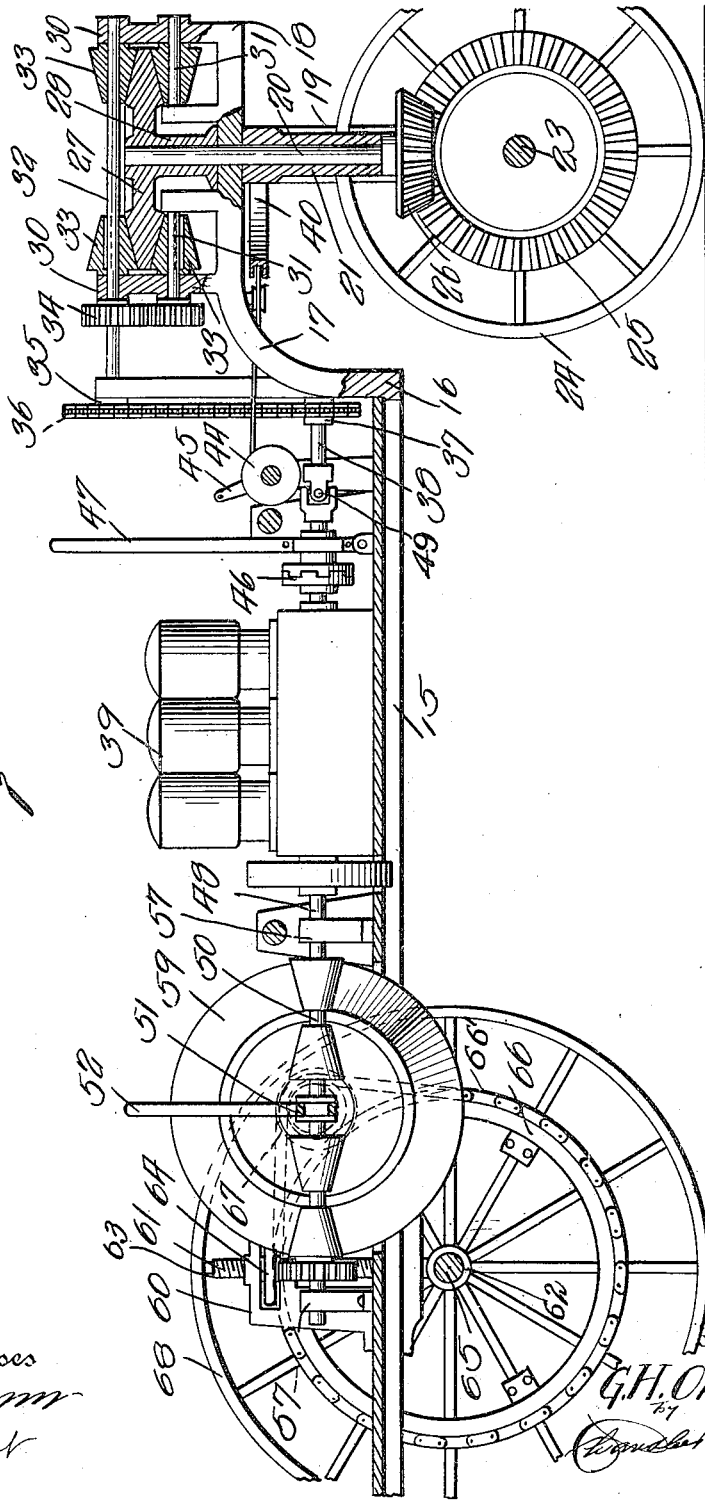

G. H. OMEALEY.
GRAIN SHOCKER.
APPLICATION FILED MAR. 24, 1913.
1,204,183.
Patented Nov. 7, 1916.
6 SHEETS—SHEET 4.
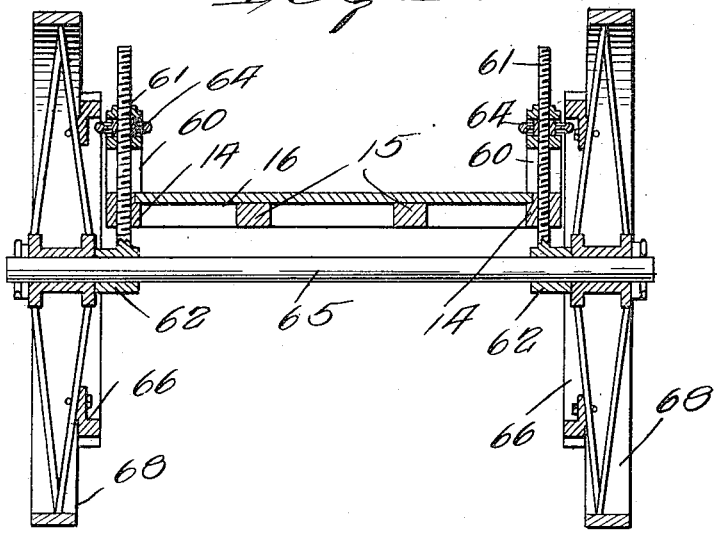
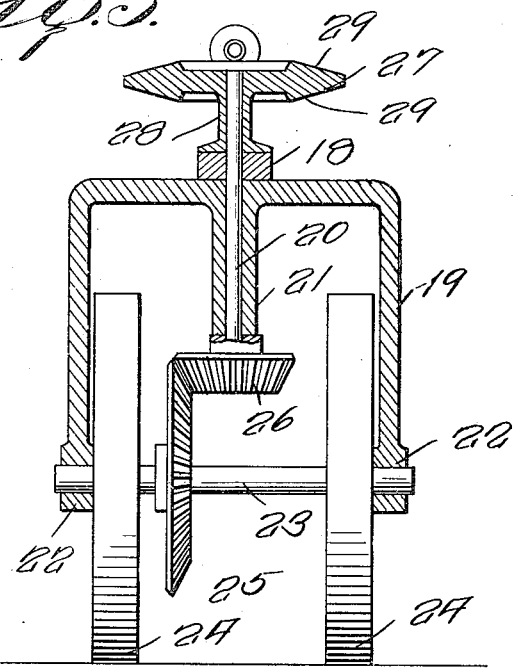
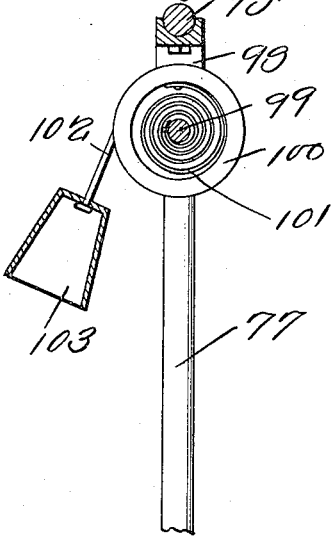
Witnesses
Inventor
C. H. Omealey
Attorneys

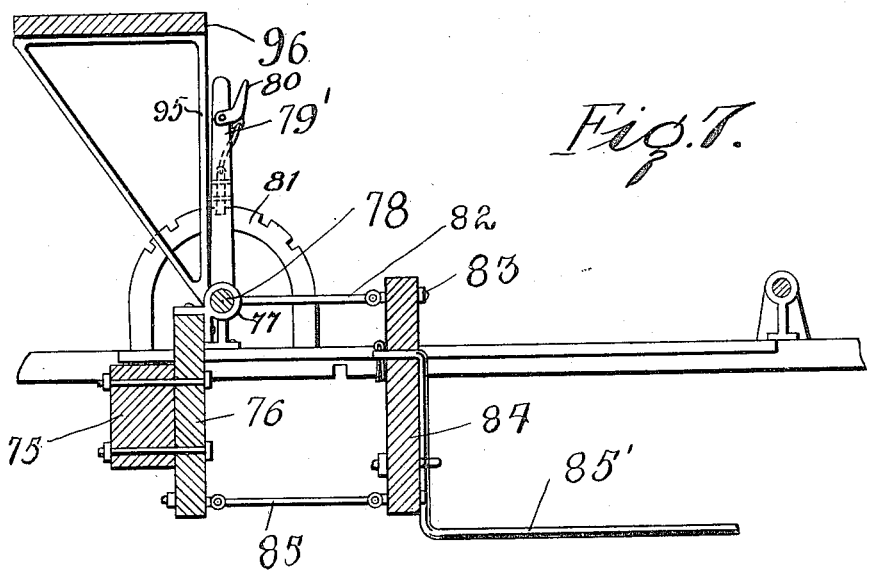
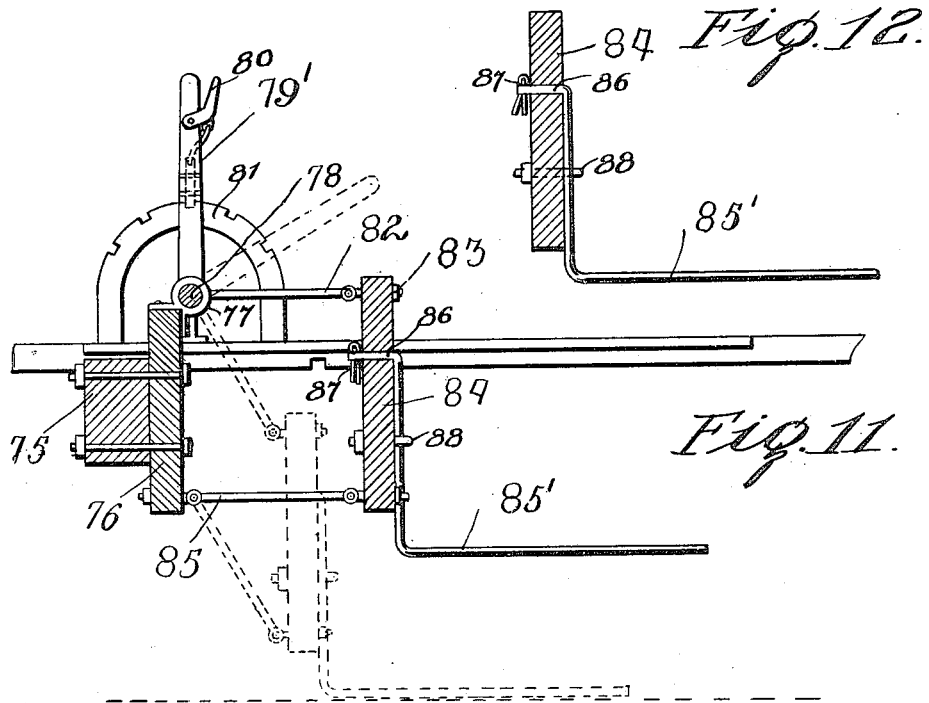

G. H. OMEALEY.
GRAIN SHOCKER.
APPLICATION FILED MAR. 24, 1913.
1,204,183.
Patented Nov. 7, 1916.
6 SHEETS—SHEET 6.
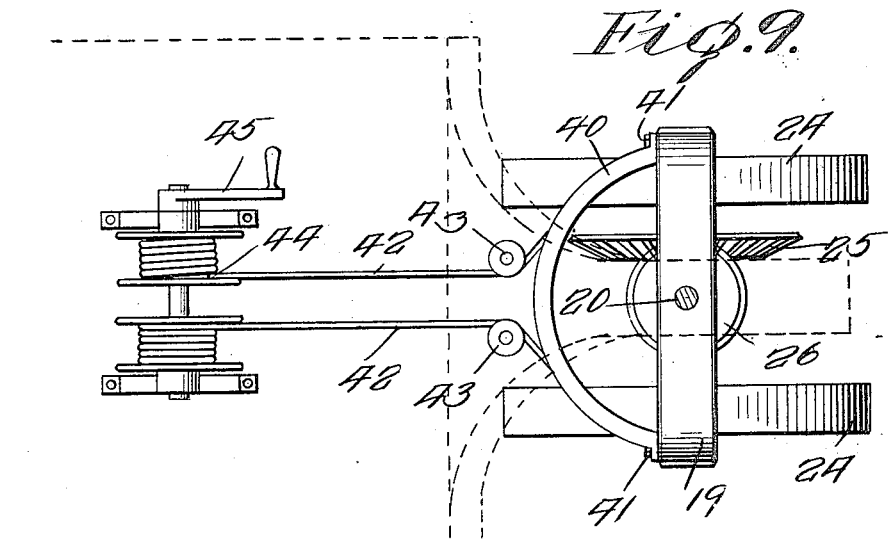
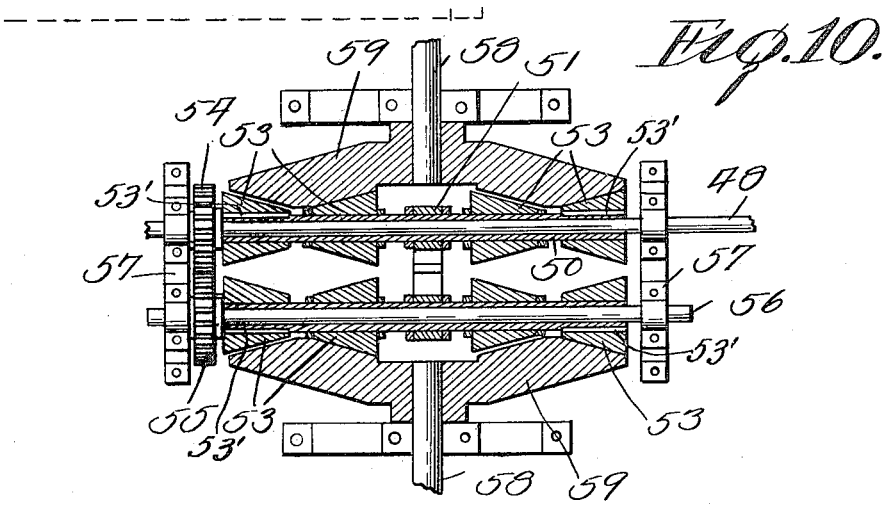
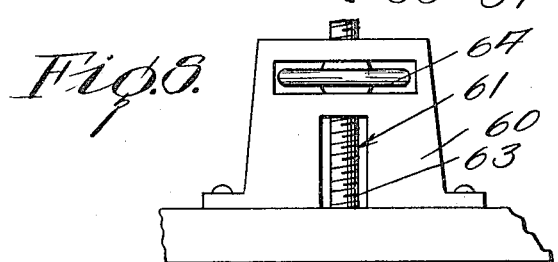
Witnesses
Inventor
G. H. Omealey
by
Attorneys

UNITED STATES PATENT OFFICE.

GEORGE HENRY OMEALEY, OF LAKE PROVIDENCE, LOUISIANA.

GRAIN-SHOCKER.

1,204,183.

Specification of Letters Patent.

Patented Nov. 7, 1916.

Application filed March 24, 1913. Serial No. 756,625.

*To all whom it may concern:*

Be it known that I, GEORGE H. OMEALEY, a citizen of the United States, residing at Lake Providence, in the parish of East Carroll, State of Louisiana, have invented certain new and useful Improvements in Grain-Shockers; and I do hereby declare the following to be a full, clear, and exact description of the invention, such as will enable others skilled in the art to which it appertains to make and use the same.

This invention relates to grain shockers and has special reference to a motor driven shocker for shocking grain as the same is harvested.

One object of the invention is to improve the general construction of devices of this character.

A second object of the invention is to provide an improved shocking table.

A third object of the invention is to provide improved means for holding the shock while it is being dropped.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a general plan view of the entire device. Fig. 2 is a side elevation thereof. Fig. 3 is a central longitudinal section through the tractor frame showing the driving mechanism carried thereby. Fig. 4 is a transverse section on the line 4—4 of Fig. 1. Fig. 5 is a similar section on the line 5—5 of Fig. 1. Fig. 6 is a detail section on the line 6—6 of Fig. 1. Fig. 7 is a section taken through the shocking table. Fig. 8 is a view of the means used for varying the position vertically of the front of the tractor frame. Fig. 9 is an enlarged detail of the steering mechanism. Fig. 10 is an enlarged detail showing the means for varying the speed of the transmission and for reversing the same. Fig. 11 is a detail section through the shocker showing the shock table raised in full lines and dropped in dotted lines. Fig. 12 is a view showing in detail the arrangement for holding the teeth of the shocker table in place.

In considering the construction of the device it may be separated in several component parts. In carrying out the description these parts will be referred to as a whole by certain capital letters. In carrying out the invention there is provided a reaper of any preferred description and this is indicated in general at A. There is also provided a tractor B which carries the reaper and which serves to operate the entire device by means of its connection. This tractor also supports a shocker table C to which the bundles are conveyed by means of the carrier D, the bundles being deposited on the carrier from the reaper.

Referring now to the reaper A, this reaper is provided with the usual knife 10 actuated in any preferred manner, the platform 11, elevator 12 and binder deck 13.

The tractor includes the longitudinal frame members 14 on the outside of the frame and the internal longitudinal members 15. These longitudinal members are connected together by the transverse members 16 and to the longitudinal members 14 and 15 there are secured, at the rear of the machine, an upward and inwardly curved member 17. The rear end of this goose neck member is connected to a casting 18 whereon is pivotally mounted an inverted U-shaped yoke 19, a shaft 20 extending through a suitable opening in the casting 18 and through a bearing sleeve 21 carried by the yoke for the purpose of making this pivotal connection. At the lower ends of the yoke arms there are provided bearings 22 through which passes a shaft 23 having fixed thereon the ground wheels 24. There is also fixed on the shaft 23 a bevel gear 25 which meshes with a bevel gear 26 fixed upon the shaft 20. Mounted on the upper end of the shaft 20 is a friction wheel 27 which is preferably made of iron and is provided with an elongated hub 28 to prevent tilting of the wheel 27. This wheel 27 is provided on each side of its periphery with a bevel friction face 29. Carried on the goose neck 17 are bearings 30 wherein are mounted the short shafts 31 and the long shaft 32.

On the shafts 31 and 32 are paper bevel friction wheels 33 arranged in pairs so that they firmly clasp the faces of the wheel 27. One of the wheels 33 is fixed upon the shaft 32 while the other wheel on said shaft rotates freely thereon. One of the shafts 31 is geared to the shaft 32 by means of the gear wheels 34 and on the shaft 32 is a sprocket 35 which is connected by a link chain belt 36 with a sprocket 37 fixed upon the main or drive shaft 38 which shaft is provided with a universal joint 49. The latter is driven by means of an engine 39 which is preferably of the multi-cylinder marine type. Secured to the upper part of the yoke 19 on the front side thereof is a semi-circular grooved member 40 which is connected to said yoke by bolts 41. In the groove of this member are carried the cables 42 which are led from guide pulleys 43 to a winding drum 44 provided with a crank handle 45. These cables 42 are wound in opposite directions on the drum so that as one cable winds up, the other will unwind thereby rotating the yoke 19 with respect to the shaft 20 independently of the movement of said shaft. So far as this part of the apparatus is concerned it will be obvious that when the shaft 38 is driven by the engine 39 the shaft 32 will also be driven and this in turn will drive the shaft 20 which will thereby convey movement to the tractor wheels 24. In order that the engine may be allowed to run without driving the wheels 24 there is provided on the shaft 38 a suitable clutch mechanism 46 which is controlled by an ordinary clutch lever 47.

Extending from the opposite end of the engine 39 is a shaft 48. The forward end of the shaft 48 has keyed thereon a sleeve 50 carrying a shipper ring 51 controlled by a lever 52. Mounted on this sleeve are spaced pairs of bevel friction pulleys 53 and one pulley of each pair is fixed by a key 53' on the sleeve whereby it will be prevented from either rotative or longitudinal movement on the sleeve, while the other is rotatably mounted thereon. These loose pulleys 53 support the opposite side of each of the disks 59 to that engaged by the fixed pulleys 53 so that rocking movement of the disks is prevented. On the sleeve is also mounted a gear 54 which meshes with a gear 55 fixed upon a shaft 56 supported in suitable bearings 57 carried by the main frame members. On these shafts 56 is also mounted a sleeve and friction pulley arrangement identical with that on the shaft 48 and controlled by the same shipper lever 52 the parts being numbered alike on both shafts. Mounted in suitable hangers carried by the main frame are shafts 58 and on each of these shafts is a friction disk 59 provided with internal and external bevel faces arranged to engage the friction pulleys 53 selectively. Now the friction pulleys 53 are arranged so that when moved to one position one internal and one external friction pulley will engage the respective friction disk 59 while the other pulleys are similarly engaged when the device is moved to the other position.

Carried by the main frame are certain standards 60 whereon are adjustably mounted the bars 61 carrying at the lower end bearings 62 and being provided with threaded upper portions 63. The standards 60 are slotted to admit the hand wheels 64 having centrally disposed nuts which fit the screws 63 respectively so that as the hand wheels are rotated the bars 61 are raised or lowered with respect to the main frame thus affording means of varying the height of said frame from the ground. Tractor wheels 68 are mounted upon the opposite ends of the front axle 65.

In the bearings 62 is supported the front axle 65 on each end of which is fixed a sprocket 66 over which a chain 66' passes, which chain is trained over a sprocket on the end of the adjacent axle 58.

In using the reaper in connection with this tractor it is secured by a stirrup 69 to the member 14 so that a shaft 70 may be arranged therein and support a tube 71 which is secured to the tractor B. The reaper is also connected to the tractor by means of a brace bar 72 and a hook 73. In order to drive the reaper the shaft 48 is preferably extended to the reaper and provided on its outer end with a sprocket 74 connected in the usual manner to the reaper mechanism, the specified connection not being deemed necessary to be shown by reason of the fact that this connection will vary with the peculiar style of reaper used.

Extending laterally from the tractor frame is a cross bar 75 whereon is bolted a plate 76 which carries at its upper end a plurality of bearings 77 wherein is supported a shaft 78 on which is fixed an operating lever 79' provided with a latch 80 which works over a quadrant 81 on the frame. Fixed upon the shaft 78 are a series of levers 82 which have their ends connected to eye bolts 83 which pass through a plate 84. Links 85 connect the lower edges of the plates 76 and 84 and are of the same effective length as the levers 82 so that the plates are kept parallel throughout their movement. This plate 84 is preferably termed the finger board and carries the shocker fingers 85' which are so arranged as to at all times remain horizontal. Each of these fingers has a portion 86 which extends through the board and is held in position by a cotter pin 87. The finger then extends across the board and is additionally held by a clip 88. Now in the operation of these parts of the device when the shock has been laid upon the fingers and it is desired to drop the same to the ground the latch lever 79' is released. This permits the downward movement of the finger board 84 so that the shock is dropped and rests between the fingers on the ground whereupon the friction of the shock ends on the ground will cause the shock to move off the smooth fingers and remain behind the machine. It is to be understood that the member 75 carries one end of the foot boards 75′.

Carried on suitable braces or legs 95 extending upward from the foot boards is a table 96 and the outer foot board is provided with a railing 97 for the protection of the operator on the outer foot board.

Fixed upon the bar 78′ are a pair of brackets 98 which support a shaft 99 whereon is journaled a grooved wheel 100. A coil spring 101 has one end connected to this wheel and the other end to shaft 99. Around the wheel 100 is wound a cable 102 and on the free end of this cable is a shock cap 103 which is designed to fit over the end of a shock to hold the same together after it has been formed on the fingers 85′. By this means when the shock is dropped by releasing the lever 79′ the top will be held together since the cap will be kept in position by the operator pressing the same on the top of the shock until the butt of the shock strikes the ground whereupon by releasing the cap the coil spring will wind it up in position for the next shock.

Suitably connected to the foot boards 75′ by braces 105 is a wheeled frame 106 supporting a bundle carrier 107 of the ordinary belt and slat type. At the lower end of this bundle carrier are guide boards 108 to receive the bundles from the reaper A. At the upper end of this bundle carrier is the usual beater 109. For the purpose of driving the carrier the axle 65 may be extended and provided with a sprocket 110 which is connected to a sprocket 111 on the upper shaft of the carrier 107 by means of a chain 112. The beater may be driven from this shaft by the usual sprocket and chain arrangement as indicated at 113.

The separate elements of the operation having been specifically described at the time of describing the mechanism it is believed that a brief review of the entire operation is all that is now necessary. The engine having been started and the shipper lever or levers properly manipulated, as also the clutch lever 47, the machine will move forward. Now as the machine moves forward the usual reaping and binding operation takes place and the separate sheaves are delivered one after the other to the bundle carrier. From this bundle carrier they are dropped on the table 96 and from there the operators on either side of the table formed by the fingers 85′, and which will be known as the shocker table, form the sheaves into shocks at the same time pressing upon the shock the cap 103. When the shock has been formed the lever 79′ is operated to drop the same and after it has been deposited on the ground this lever is again worked to raise the parts in position for the next shock.

There has thus been provided a simple and efficient device of the kind described and of the character specified.

It will be obvious that many minor changes may be made in the form and construction of the invention without departing from the material principles thereof. It is not therefore desired to confine the invention to the exact form herein shown and described, but it is wished to include all such as come properly within the scope claimed.

Having thus described the invention, what is claimed as new, is:—

1. In a shocker, the combination with a drop table; of a shock cap, and a yieldable mounting for said shock cap.

2. In a shocker, a shock holder including a frame, a wheel journaled in said frame, a cable wound around said wheel; a spring arranged to rewind the cable when the latter is unwound, and a shock cap connected to the cable and adapted to fit the top of a shock.

3. In a shocker, a shock holder including a frame, a wheel journaled in said frame, a cable wound around said wheel; a spring arranged to rewind the cable when the latter is unwound, and a shock cap connected to the cable and adapted to fit the top of a shock; in combination with a tilting table having its upper end below said cap when the latter is wound up.

In testimony whereof, I affix my signature, in the presence of two witnesses.

GEORGE HENRY OMEALEY.

Witnesses:
J. D. MILLER,
E. P. CAMPBELL.

Copies of this patent may be obtained for five cents each, by addressing the "Commissioner of Patents, Washington, D. C."